United States Patent
Hong et al.

(10) Patent No.: US 12,241,825 B2
(45) Date of Patent: Mar. 4, 2025

(54) APPARATUS FOR DETECTING MICROPLASTICS BASED ON DIFFERENTIAL INTERFERENCE CONTRAST MICROSCOPE SYSTEM

(71) Applicant: KOREA INSTITUTE OF SCIENCE AND TECHNOLOGY, Seoul (KR)

(72) Inventors: Seok Won Hong, Seoul (KR); Jae Hun Kim, Seoul (KR); Jiyun Han, Seoul (KR); Subeen Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 49 days.

(21) Appl. No.: 18/187,405

(22) Filed: Mar. 21, 2023

(65) Prior Publication Data
US 2024/0027324 A1    Jan. 25, 2024

(30) Foreign Application Priority Data

Jul. 19, 2022 (KR) ................. 10-2022-0088633
Feb. 2, 2023 (KR) ................. 10-2023-0014109

(51) Int. Cl.
*G01N 15/1434* (2024.01)
*G01N 15/14* (2024.01)
(Continued)

(52) U.S. Cl.
CPC ..... *G01N 15/1434* (2013.01); *G01N 15/1429* (2013.01); *G02B 21/06* (2013.01);
(Continued)

(58) Field of Classification Search
CPC ........... G01N 15/1434; G01N 15/1429; G01N 2015/144; G01N 2015/1486; G01N 2015/0294; G01N 15/0227; G01N 15/1433; G01N 2015/0038; G01N 2015/0053; G01N 2015/1493; G01N 2015/1497;
(Continued)

(56) References Cited

U.S. PATENT DOCUMENTS

| 7,605,919 | B2 | 10/2009 | Oma et al. |
| 8,088,615 | B2 | 1/2012 | Ausserre |

(Continued)

FOREIGN PATENT DOCUMENTS

| EP | 3951353 A1 * | 2/2022 | ........ B01L 3/502776 |
| JP | 2014-525583 A | 9/2014 | |

(Continued)

OTHER PUBLICATIONS

Elsayed et al. "A microfluidic chip enables fast analysis of water microplastics by optical spectroscopy" *Scientific Reports*, vol. 11, No. 1, 2021, (pp. 1-11).

(Continued)

*Primary Examiner* — Fernando Alcon
(74) *Attorney, Agent, or Firm* — NSIP Law (57) ABSTRACT

The present disclosure relates to an apparatus for detecting microplastics based on optical technology, more particularly the present disclosure relates to an apparatus for detecting microplastics, which is capable of detecting and analyzing microplastics of various sizes that exist in a fluid in real time regardless of transparency using a microfluidic chip based on optical technology.

6 Claims, 11 Drawing Sheets

(51) Int. Cl.
  *G01N 15/1429* (2024.01)
  *G02B 21/06* (2006.01)
  *G02B 21/36* (2006.01)
  *G06T 7/60* (2017.01)
  *G06V 20/69* (2022.01)

(52) U.S. Cl.
  CPC .............. *G02B 21/365* (2013.01); *G06T 7/60* (2013.01); *G06V 20/693* (2022.01); *G01N 2015/144* (2013.01); *G01N 2015/1486* (2013.01); *G06T 2207/10056* (2013.01); *G06T 2207/30242* (2013.01)

(58) Field of Classification Search
  CPC .. G01N 15/1484; G02B 21/06; G02B 21/365; G06T 7/60; G06T 2207/10056; G06T 2207/30242; G06V 20/693
  See application file for complete search history.

(56) References Cited

U.S. PATENT DOCUMENTS

| | | | | |
|---|---|---|---|---|
| 2023/0102792 | A1* | 3/2023 | Takatsuka | G01N 15/1425 |
| 2023/0285969 | A1* | 9/2023 | Khoo | B01L 3/502761 |
| 2023/0408396 | A1* | 12/2023 | Hanay | G01N 15/0266 |
| 2023/0417662 | A1* | 12/2023 | Ono | G01N 21/3563 |
| 2024/0011907 | A1* | 1/2024 | Kitagawa | G01N 21/643 |
| 2024/0125677 | A1* | 4/2024 | Gao | G01N 1/28 |
| 2024/0319486 | A1* | 9/2024 | Takanashi | G02B 21/0036 |

FOREIGN PATENT DOCUMENTS

| | | |
|---|---|---|
| KR | 10-2005-0097218 A | 10/2005 |
| KR | 10-1856753 B1 | 5/2018 |
| KR | 10-2094373 B1 | 3/2020 |
| KR | 10-2020-0106652 A | 9/2020 |
| KR | 10-2020-0129731 A | 11/2020 |
| KR | 10-2020-0129732 A | 11/2020 |
| KR | 10-2229764 B1 | 3/2021 |
| KR | 10-2247677 B1 | 5/2021 |
| KR | 10-2296894 B1 | 9/2021 |
| KR | 10-2022-0055263 A | 5/2022 |
| KR | 10-2022-0093623 A | 7/2022 |
| WO | WO 2005/095925 A1 | 10/2005 |
| WO | WO 2013/033253 A1 | 3/2013 |
| WO | WO 2021/061796 A1 | 4/2021 |

OTHER PUBLICATIONS

Yu et al. "Nanoscale Terahertz Monitoring on Multiphase Dynamic Assembly of Nanoparticles under Aqueous Environment" *Advanced Science*, vol. 8 No. 11, 2021 (pp. 1-9).

Korean Office Action issued on Jul. 22, 2024, in counterpart Korean Patent Application No. 10-2023-0014109 (7 pages in English, 7 pages in Korean).

Korean Office Action issued on Oct. 21, 2024, in counterpart Korean Patent Application No. 10-2023-0014109 (3 pages in English, 2 pages in Korean).

* cited by examiner

APPARATUS FOR DETECTING MICROPLASTICS BASED ON DIFFERENTIAL INTERFERENCE CONTRAST MICROSCOPE SYSTEM

DESCRIPTION OF GOVERNMENT-SUPPORTED RESEARCH AND DEVELOPMENT

This research was supervised by the Korea Institute of Science and Technology and supported by the Ministry of Science and ICT of Korea with the project title Support for Management on Research of Korea Institute of Science and Technology and the research title Development of Innovative Fusion Technology to Cope with Climate Disaster (project ID: 1711173309).

CROSS-REFERENCE TO RELATED APPLICATIONS

This application claims priority to Korean Patent Application Nos. 10-2022-0088633 filed on Jul. 19, 2022, and 10-2023-0014109 filed on Feb. 2, 2023, and all the benefits accruing therefrom under 35 U.S.C. § 119, the entire contents of which are herein incorporated by reference for all purposes.

BACKGROUND

1. Field

The present disclosure relates to an apparatus for detecting microplastics based on optical technology, more particularly to an apparatus for detecting microplastics, which can detect and analyze microplastics of various sizes that exist in a fluid in real time regardless of transparency using a microfluidic chip based on optical technology.

Description of the Related Art

The plastics released into the hydrosphere are broken into small fragments due to physical and chemical causes. In general, plastics with a size of 5 mm or smaller are called microplastics.

Microplastics are ubiquitous pollutants that originate from a variety of sources due to material transport and can accumulate across different media. Concerns about their effects on the environment and organisms including humans are widespread. Microplastics transport persistent organic pollutants through adsorption. Because the surface area of the microplastic particles per same volume is increased greatly as the size of the particles is smaller, the adsorption phenomenon is accelerated. In addition, microplastic with a relatively small size is very harmful to the human body because they are highly likely to cross cellular membranes and cause severe effects on the nervous or immune system.

In water, plastics are broken into microplastics of 5 mm or smaller or even smaller nanoplastics due to photodegradation and erosion by UV or physical and chemical weathering. Especially, in water, colored microplastics predominantly become transparent as they lose their color. The transparency or semi-transparency characteristics as well as various shapes and sizes of the microplastics make the detection of the microplastics more difficult.

Various methods, including, optical microscopy, spectroscopy, and thermo-analytical methods, are currently used for the detection of microplastics. Although the spectroscopic method allows elemental analysis, there is a limitation in the measurable size of microplastic particles (20 µm or larger for Fourier transform infrared; 1 µm or larger for Raman spectroscopy). The Pyrolysis-gas chromatography-mass spectrometry is not limited by the size of the microplastics but is disadvantageous in that this thermo-analytical method has destructive nature, the extensive analysis time, and limited sample mass input of 0.5 mg.

Although the optical microscopic method seems the most suitable method for detection of microplastics because of fast analysis time and low cost, it is limited in detecting transparent microplastics in water because of the low concentration and relatively low difference in refractive index between the microplastics and background materials such as water.

In addition, the existing technologies have the problems of complicated device configuration, requirement for pretreatment such as fluorescence treatment and difficulty in real-time measurement. Furthermore, the terahertz device is generally inapplicable as a mobile device due to a very large volume.

SUMMARY

The present disclosure is directed to providing an apparatus for detecting microplastics, which is capable of detecting and analyzing microplastics of various sizes that exist in a fluid in real time regardless of transparency using a microfluidic chip based on optical technology.

The apparatus for detecting microplastics based on optical technology according to the present disclosure includes: a microfluidic chip with microchannel, in which a fluid contained assists microplastics to flow; an optical imaging device which is capable of observing the microplastics in the fluid regardless of how much the microplastics are transparent by focusing a point in the microchannel; an image sensing device that senses the observed image; and an image analysis device that counts the number of the microplastics in the image and analyzes the shape and size of the microplastics A bandpass filter, which passes the light with a specific wavelength range, is placed between a light source and a first polarizer of the optical imaging device. The wavelength range of the bandpass filter may have a full width at half maximum (FWHM) of 20-30 nm.

A magnification system is placed between the second polarizer of the optical imaging device and the image sensing device, and the magnification system magnifies the image of a beam that has passed through the second polarizer while the optical imaging device remains focused on the microchannel.

An objective lens of the optical imaging device is disposed below the microfluidic chip so as to focus on the microchannel.

The optical imaging device includes: a Köhler illumination system that is disposed between a light source and a bandpass filter such that the image of the light source is formed at the back focal plane of an objective lens; the bandpass filter that is disposed between the Köhler illumination system and the first polarizer so as to pass light having a wavelength within a specific range; the first polarizer which converts unpolarized light to linear polarized light by passing a one vibration direction and absorbs or reflects other direction; a polarizing prism that is disposed at the back focal plane of the objective lens, splits a beam that has been linearly polarized by the first polarizer into orthogonal oscillating two beams, and allows the beams reflected at a sample to be recombined to interfere with each other; the second polarizer which passes only the beam that has been recombined by the polarizing prism; and a magnification system which magnifies the image of the beam that has passed through the second polarizer while the optical imaging device remains focused on the microchannel.

The microfluidic chip has a structure, in which a transparent glass plate and a flow path substrate are coupled, and a microchannel is patterned on the flow path substrate. Both ends of the microchannel have a fluid inlet and outlet, respectively, and a sample containing microplastics is introduced through the inlet and is discharged through the outlet by a pressure pump after observation of an optical imaging device is completed.

The apparatus for detecting microplastics based on optical technology according to the present disclosure has the following effects.

Microplastics with various sizes presented in water can be detected and realized in real time regardless of the transparency of the microplastics using a combination of an optical imaging device and a microfluidic chip. In addition, a pretreatment process for sample preparation is unnecessary.

DETAILED DESCRIPTION

The present disclosure presents technology for detecting microplastics of various sizes present in water, regardless of the transparency of the microplastics. The present disclosure employs a microfluidic chip as a device for capturing and detecting microplastics based on optical technology and presents optimized conditions for the detection of microplastics with various sizes and transparency.

As mentioned earlier in the 'Background' section, different apparatuses are necessary for the detection of microplastics with different sizes, and the destructive thermoanalytical method is not suitable for the quantitative detection of microplastics The optical technology employed in the present disclosure is capable of visualizing the morphology of a sample three-dimensionally without special manipulation (labeling), regardless of the transparency of the sample. This allows for the observation of the shape, structure, size, etc. of the sample with a microscope, by artificially inducing light interference using a polarizer and a polarizing prism and thereby maximizing the contrast of the sample. Whereas the common optical microscope requires labeling, such as fluorescence staining for measurement of a transparent sample, the present disclosure does not require such treatment. The transparency of microplastics is determined by refractive index and absorbance. If the refractive index of microplastics is the same as that of water, they have high transparency, and the transparency of microplastics is also affected by the absorbance, depending on the color of the microplastics.

According to the optical technology of the present disclosure, it is possible to obtain a non-fluorescent image of nanoparticles and accurately observed the transport of plastics of nano- or sub micrometer-sizes with small refractive indices, regardless of transparency. Moreover, the present disclosure enables quantitative analysis of microplastics present in water by counting the number of microplastics through analysis of the images obtained by an optical imaging device.

Optimization of the optical imaging device is required to observe the microplastics having various sizes and transparency, which are present in water, morphologically and quantitatively. The optical imaging device according to the present disclosure employs a bandpass filter in order to reduce chromatic aberration resulting from the difference in refraction angles and maintain light quantity at a predetermined level, and employs a bandpass filter of a specific wavelength range in order to detect nanometer-sized nanoplastics.

In addition, a magnification system is employed to observe microplastics of various sizes and transparency. Although the microplastics of various sizes and transparency can be observed by adjusting the magnification of the objective lens, it becomes very difficult to focus on all microplastics if the magnification of the objective lens is increased. In contrast, if the magnification system is employed between the second polarizer and an image sensing device of the optical imaging device, even the nanometer-sized nanoplastics can be detected while maintaining the focus on the sample.

Furthermore, for the easier observation of a microchannel of the microfluidic chip, it is necessary to dispose the objective lens below the microfluidic chip (inverted type).

In addition to the optimization of the optical imaging device described above, the present disclosure employs a microfluidic chip and a fluid transportation device for real-time morphological and quantitative observation of the microplastics by the optical imaging device.

The microfluidic chip has a microchannel filled with the fluid containing microplastics. Because the optical imaging device focuses on a point in the microchannel, the microplastics included in the fluid, which moves in the microchannel, can be detected. By observing the fluid that flows in the microchannel in real time, it is possible to observe the presence of microplastics morphologically and quantitatively. For accurate morphological and quantitative observation of the microplastics contained in the fluid, the microchannel is designed in consideration of fluid resistance.

The fluid transportation device is a device that supplies the fluid containing microplastics to the microchannel. It is composed of a pressure pump and a flow sensor and can control the transportation speed of the fluid supplied to the microfluidic chip through the pressure pump and the flow sensor.

As described above, the present disclosure allows morphological and quantitative observation of the microplastics with various sizes and transparency, which are present in a fluid, in the microfluidic chip based on optical technology. For this, the present disclosure presents a configuration which optimizes the optical imaging device, the microchannel of the microfluidic chip and the fluid transportation device.

Hereinafter, an apparatus for detecting microplastics based on optical technology according to an exemplary embodiment of the present disclosure will be described in detail referring to drawings.

Figure 1:
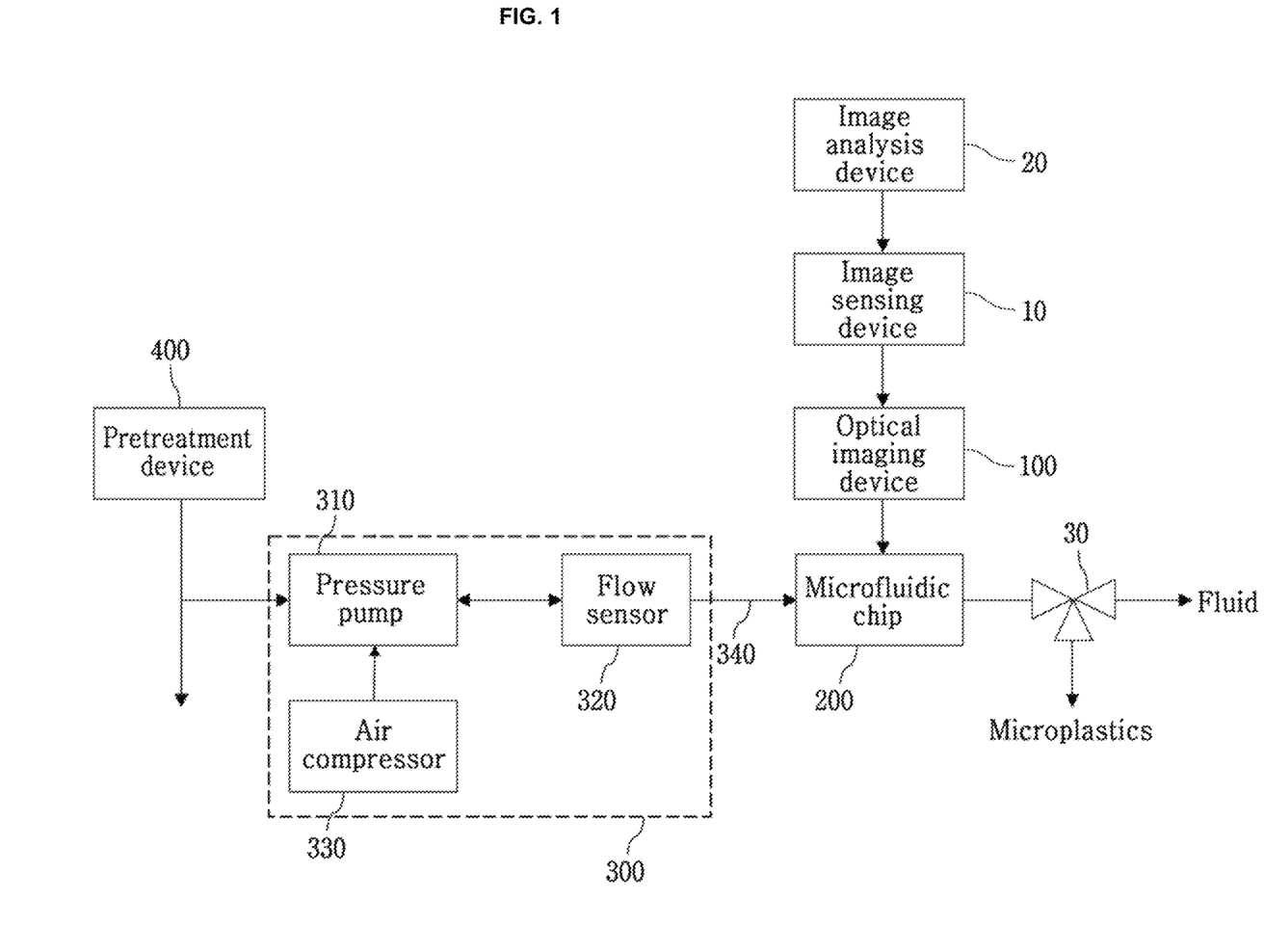
FIG. 1 shows the schematic of an apparatus for detecting microplastics based on optical technology according to an exemplary embodiment of the present disclosure.

Referring to FIG. 1, an apparatus for detecting microplastics based on optical technology according to an exemplary embodiment of the present disclosure includes an optical imaging device 100, a microfluidic chip 200, a fluid transportation device 300, an image sensing device 10 and an image analysis device 20.

The optical imaging device 100 visualizes a sample by improving contrast without pretreatment such as staining, etc. It focuses on a microchannel 230 equipped in the microfluidic chip 200 so as to detect microplastics contained in a fluid moving through the microchannel 230. The microfluidic chip 200 provides a space through which the fluid containing microplastics is transported and is disposed above an objective lens 117 of the optical imaging device 100. The fluid transportation device 300 supplies the fluid containing microplastics to the microchannel 230 of the microfluidic chips 200, and the image sensing device 10 is disposed at the rear end of the optical imaging device 100 and senses the image observed by the optical imaging device 100. And the image analysis device 20 counts the number of the microplastics in the image and analyzes the size and shape of the microplastics by analyzing the image sensed by the image sensing device 10.

Hereinafter, each component of the apparatus will be described in detail.

Figure 2:
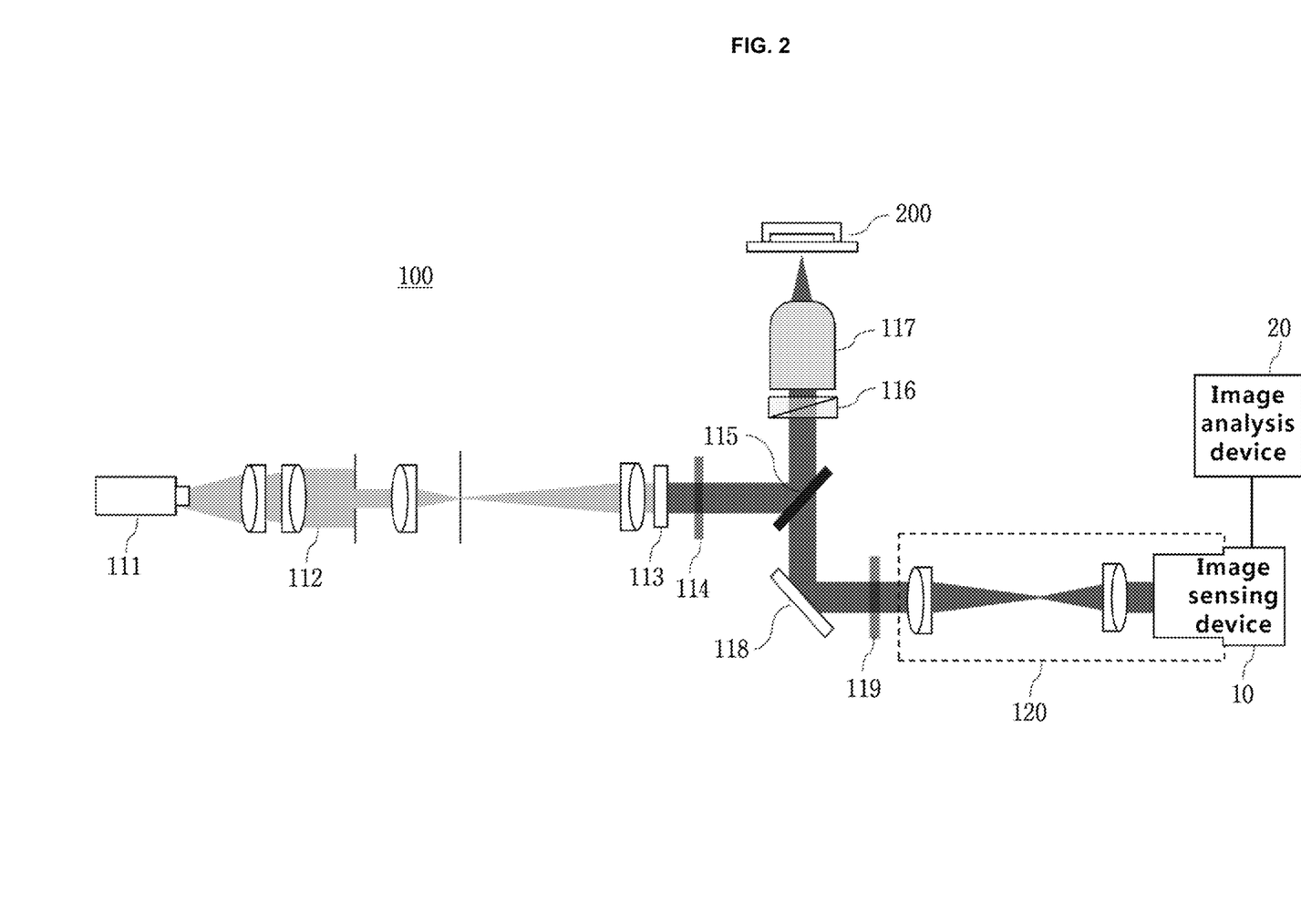
FIG. 2 shows the schematic of an optical imaging device according to an exemplary embodiment of the present disclosure.

First, as shown in FIG. 2, the optical imaging device 100 includes a light source 111, a Köhler illumination system 112, a bandpass filter 113, a first polarizer 114, a polarizing prism 116, an objective lens 117, a second polarizer 119 and a magnification system 120.

Light source 111 is a source of light for optical analysis. It emits light of a specific wavelength range such as X-ray, UV, visible light, infrared, etc. depending on the analysis method. In the present disclosure, a halogen lamp emitting visible light or a monochromatic LED may be used as the light source 111 because interference in the visible region is measured by the optical imaging device 100. In an exemplary embodiment of the present disclosure, a 250-W halogen lamp was used.

The Köhler illumination system 112 is one of the methods of specimen inflammation used for optical microscopy. When the Köhler illumination system 112 is used, the image of the light source 111 is formed at the back focal plane of the objective lens 117 and the light from the sample becomes parallel and partially coherent. The Köhler illumination system 112 can prevent the image of the light source 111 formed on the sensing device 10 with the image of the sample and allows uniform illumination for the whole sample. In an exemplary embodiment, the Köhler illumination system 112 may be configured as a combination of an achromatic doublet lens and a diaphragm. In the present specification, the 'sample' refers to a fluid containing microplastics.

The bandpass filter 113 refers to a device that passes wavelengths within a certain range and blocks or attenuates wavelengths outside the range. Particularly, in the present disclosure, it refers to an optical bandpass filter. The bandpass filter 113 is used to reduce chromatic aberration resulting from the difference in refraction angles and maintain the light quantity that can be measured by the image sensing device 10.

The resolving power of a microscope refers to the minimum distance between resolvable points. It is determined by the diffraction of light and can be expressed by Equation 1. From Equation 1, it can be seen that the resolving power is improved as the wavelength of light is shorter even for the same objective lens 117. For this reason, the bandpass filter 113 which passes only wavelengths within a specific range is used.

$$d = \frac{\lambda}{2n \sin \theta} \quad \text{(Equation 1)}$$

(d is the minimum distance between resolvable points, n is the refractive index, θ is the half angle of the pencil of light illuminated to the sample, and λ is the wavelength of light)

In the present disclosure, a bandpass filter 113 with a wavelength range of 400-600 nm having a full width at half maximum (FWHM) of 20-30 nm may be used in order to detect microplastics with a size of several hundred nanometers by increasing optical resolution while reducing chromatic aberration and maintaining light quantity. In an example of the present disclosure, a bandpass filter 113 with a wavelength of 550 nm having a full width at half maximum of 20 nm was used. FIGS. 4A-4D show the images obtained using the optical imaging device 100 and the image sensing device 10. It can be seen that not only microplastics with a size of 10 μm but also microplastics with a size of 200 nm can be detected.

The first polarizer 114 is an optical device which passes only a polarized component of one direction and absorbs or reflects other components. It can convert unpolarized light of the light source 111 to polarized light. In the present disclosure, a linear polarizer is used.

The polarizing prism (differential interference contrast prism) 116 is an optical device which manipulates polarized light. It is a polarizing prism prepared by joining two orthogonal, birefringent slabs and is disposed at the back focal plane of the objective lens 117. The polarizing prism 116 splits the beam linearly polarized by the first polarizer 114 into two orthogonal, independent beams, which reflect at the sample (fluid containing microplastics) and are recombined to interfere with each other.

Whereas the general optical imaging device uses polarizing prisms for the upper and lower parts of the sample, in the present disclosure, one polarizing prism 116 is disposed below the objective lens 117, and the polarizing prism 116 is controlled such that bias is applied to the two beams, thereby improving contrast. In the images obtained by the optical imaging device 100, a microfluidic chip having a flat bottom is represented as gray, and the microplastics moving in the microchannel 230 of the microfluidic chips 200 are represented as a dark grey to bright gray three-dimensional spheres.

In order to fix the position of the polarizing prism 116, it is desirable to adjust the microfluidic chip 200, rather than the objective lens 117, along the z-axis. When microplastics of various sizes are present in the fluid, the microplastics with the smallest size should be focused.

The second polarizer 119 is an optical device having the same characteristics as the first polarizer 114 and serves to pass only the beam recombined by the DIC prism. The beam that has passed through the second polarizer 119 is sensed by the image sensing device 10.

The magnification system 120 is an optical system which magnifies the image of the sample to be analyzed.

In order to detect and count the microplastics, the image of the sample should be magnified by approximately 100 times. In the general microscope system, the image is magnified by increasing the magnifying power of the objective lens 117. But, when the magnification of the objective lens 117 is increased in the present disclosure, the field of view is reduced, making it difficult to measure the microfluidic chip 200 having a large area. Here, the field of view refers to the range detectable by the image sensing device 10.

In addition, the working distance and depth of field are decreased as the magnifying power of the objective lens 117 is increased. The working distance is the distance between the objective lens 117 and the sample. A longer working distance is favored for detection of the microplastics contained in the fluid that moves in the microchannel 230 of the microfluidic chips 200. And the depth of field is the distance between the nearest and the furthest objects that are in acceptably sharp focus in an image. If the depth of field is small, it is difficult to detect microplastics of various sizes at once. Accordingly, it is limited in achieving the desired magnification only with the magnifying power of the objective lens 117. Therefore, in the present disclosure, the magnification system 120 is employed in front of the image sensing device 10. As a result, it is not necessary to magnify the image excessively such that the resolution is decreased.

In an exemplary embodiment of the present disclosure, the magnification system 120 may consist of two achromatic doublet lenses and a zoom lens system. In this case, images magnified by 100 and 200 times can be obtained by using 20× and 40× objective lenses 117.

In the present disclosure, the optical imaging device 100 consists of the objective lens 117 in an inverted type in which the objective lens 117 is disposed under the measurement object. The microfluidic chip 200, which is the measurement object, is disposed of above the objective lens 117 due to the instrumental structure of the microfluidic chip. The microfluidic chip 200 is provided with a microchannel 230 equipped below a substrate prepared from a polymer material, as will be described later. The microfluidic chip is disposed of above the objective lens 117 for easier observation of the fluid flowing in the microchannel 230.

Next, the microfluidic chip 200 will be described.

Figure 3A:
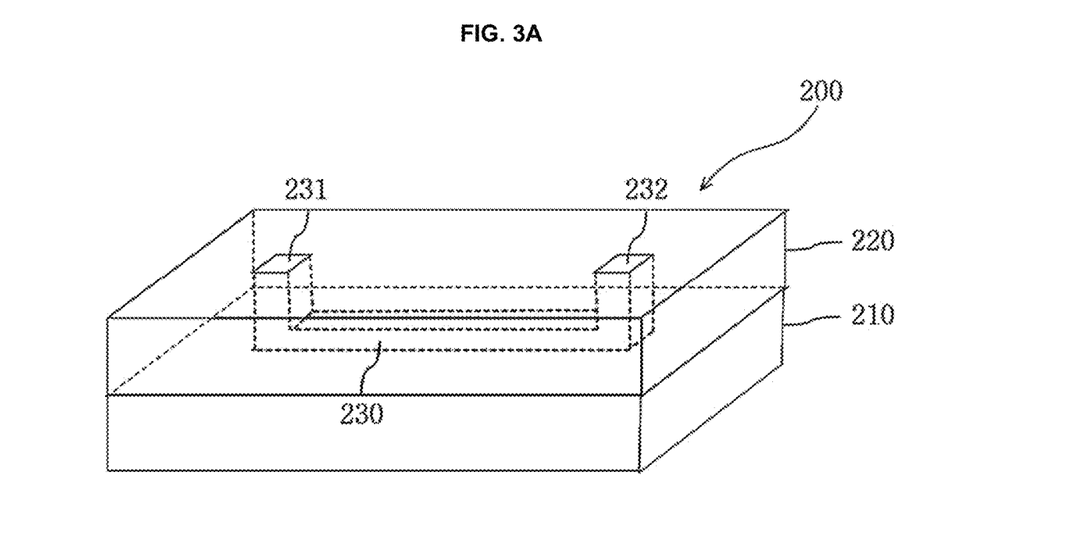
FIG. 3A and FIG. 3B show the schematic of a microfluidic chip according to an exemplary embodiment of the present disclosure.
Figure 3B:
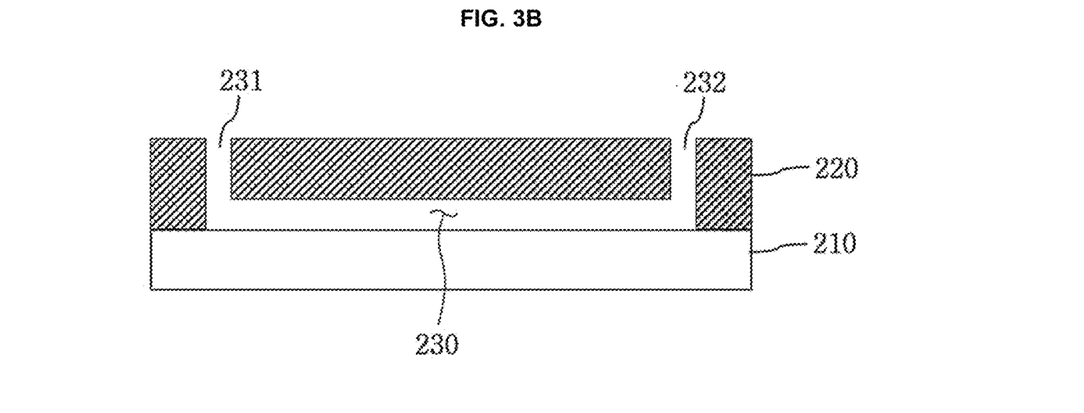
Figure 4A:
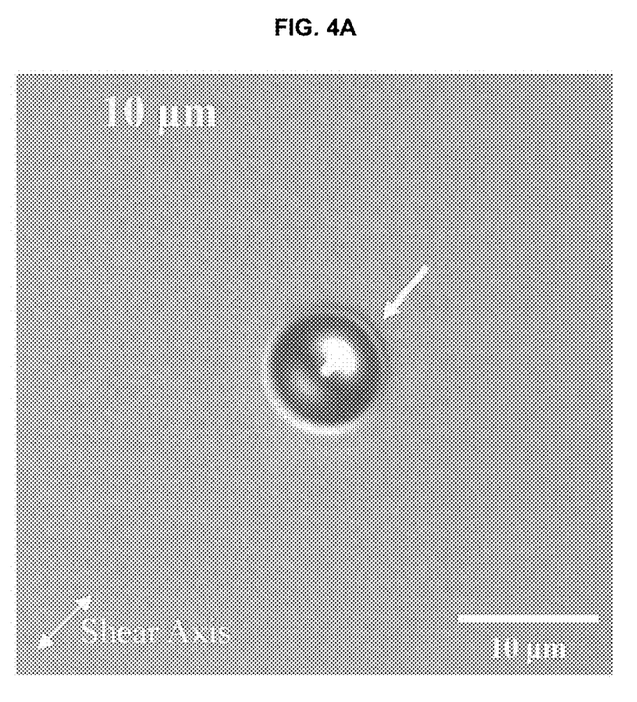
FIGS. 4A-4D and FIGS. 5A-5C shows the images obtained using an optical imaging device and an image sensing device according to an exemplary embodiment of the present disclosure.
Figure 4B:
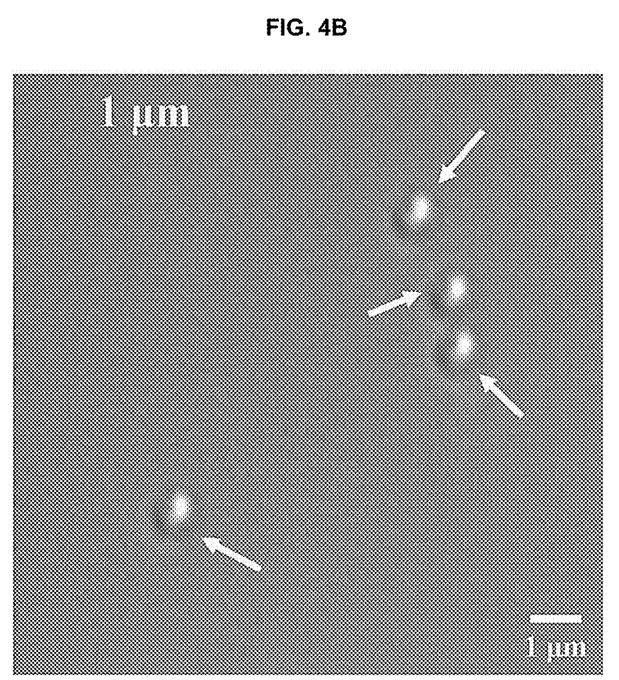
Figure 4C:
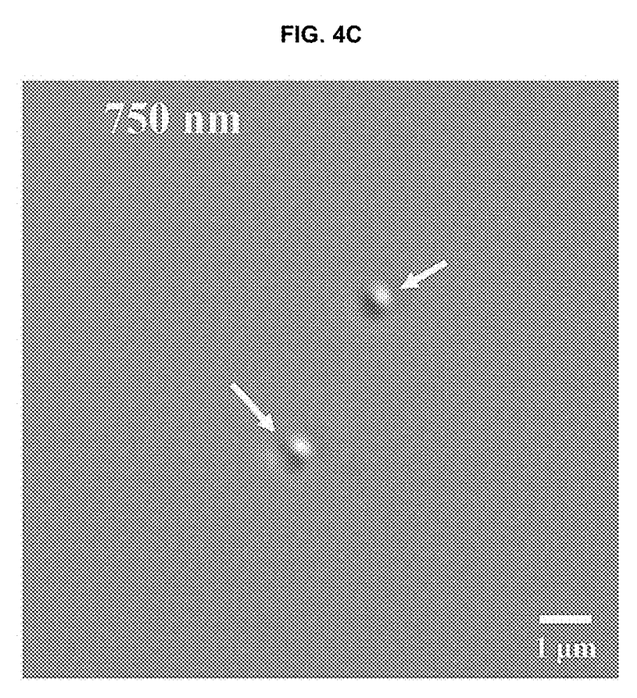
Figure 4D:
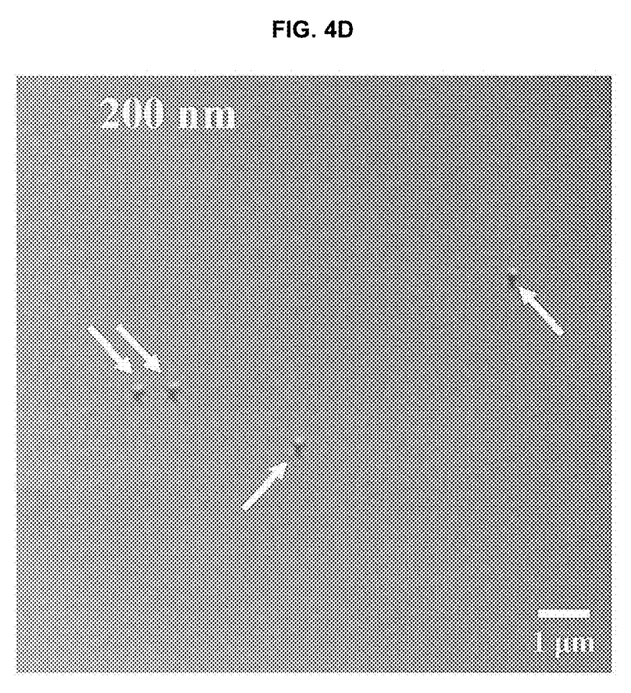

Referring to FIG. 3A and FIG. 3B, the microfluidic chip 200 has a structure, in which a transparent glass plate and a flow path substrate are coupled, and a microchannel is patterned on the flow path substrate. The microchannel 230 is equipped in the flow channel substrate 220 as the flow channel substrate 220 is excavated partly. The microchannel 230 formed in the flow channel substrate 220 is a space through which the fluid containing microplastics moves. Since the objective lens 117 of the optical imaging device 100 is disposed below the transparent glass plate 210 to focus the microchannel 230, it is preferred that the lower surface of the microchannel 230 is located in the same plane as the upper surface of the transparent glass plate 210 for easy observation. A fluid inlet 231 and a fluid outlet 232 are provided at each end of the microchannel 230, respectively. The fluid inlet 231 and the fluid outlet 232 may be formed in a vertical direction and the microchannel 230 may be formed in a horizontal direction. The fluid containing microplastics to be detected is supplied through the fluid inlet 231, and the fluid is discharged through the fluid outlet 232 by passing through the microchannel 230 after the observation has been completed by the optical imaging device 100. The fluid containing microplastics that has been discharged through the fluid outlet 232 is finally separated and removed by a three-way valve 30.

The flow channel substrate 220 equipped with the microchannel 230 is made of a polymer material such as PDMS. The flow channel substrate 220 equipped with the microchannel 230, the fluid inlet 231 and the fluid outlet 232 may be prepared by embossing-patterning a silicon substrate to form the microchannel 230, the fluid inlet 231 and the fluid outlet 232 through photolithographic and etching processes and then pouring a polymer solution, e.g., a PDMS solution, onto the embossing-patterned silicon substrate. After the flow channel substrate 220 is prepared, the surface of the microchannel 230, the fluid inlet 231 and the fluid outlet 232 may be treated hydrophilically or hydrophobically, if necessary.

Figure 5A:
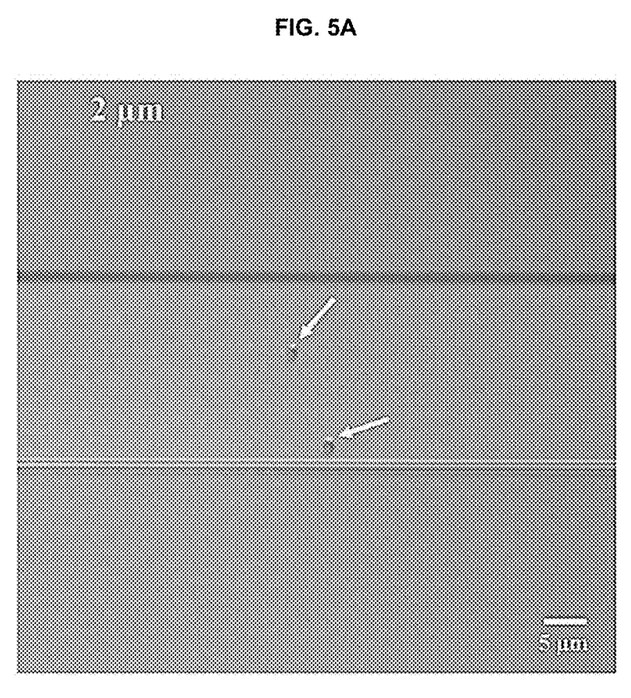
Figure 5B:
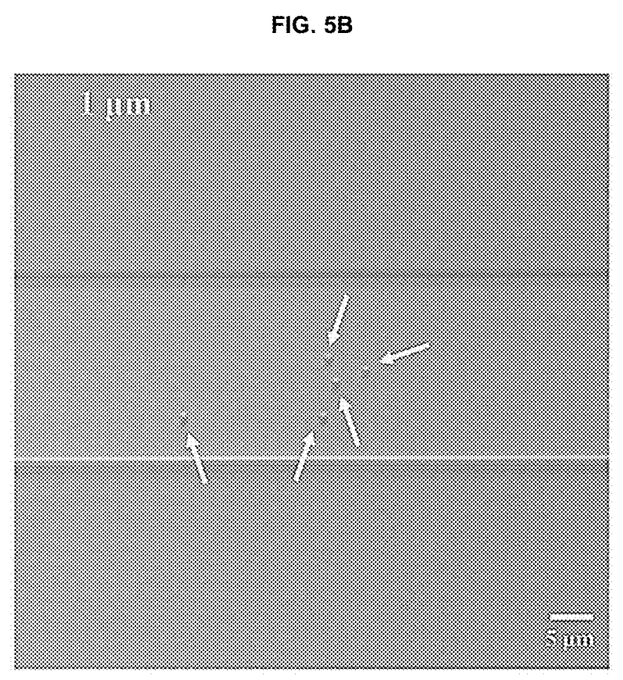
Figure 5C:
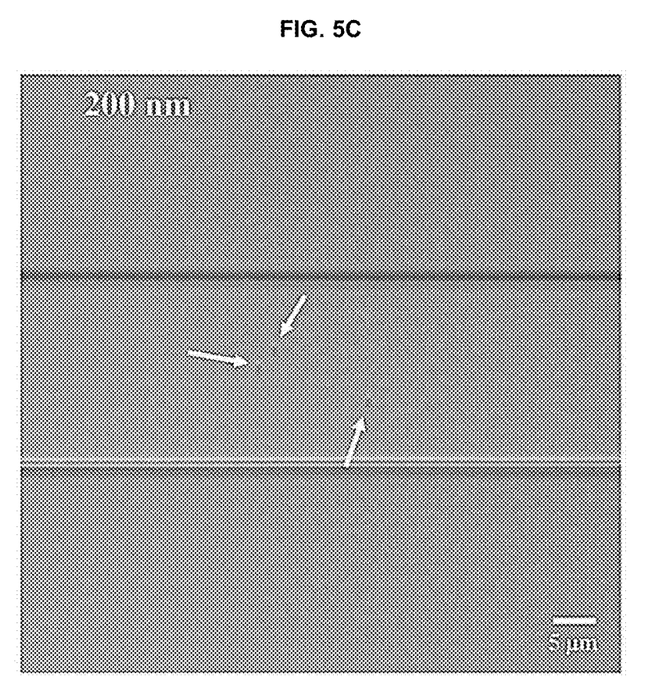
Figure 6:
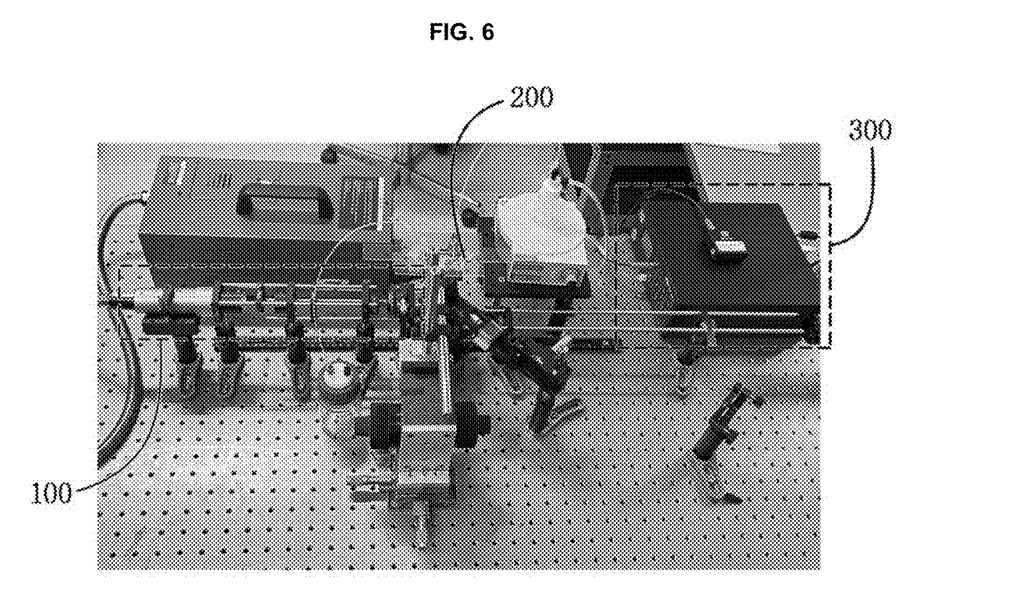
FIG. 6 shows the captured image of an apparatus for detecting microplastics based on optical technology prepared according to an exemplary embodiment of the present disclosure.

The optical imaging device 100 is focused on the microchannel 230. For easier focusing of the objective lens 117, it is desired to set the ratio of the height and width of the microchannel 230 at 1:2-1:3 in consideration of the fluid resistance defined by Equation 2. If the ratio of the height and width of the microchannel 230 is smaller than 1:2, it is difficult to focus the objective lens 117. And, if it is larger than 1:3, the fluid flow becomes too slow. FIGS. 5A, 5B and 5C shows the images of microplastics with a size of 2 μm (FIG. 5A), 1 μm (FIG. 5B) and 200 nm (FIG. 5C) flowing in the microchannel 230 with a diameter of 50 μm, which were obtained by the optical imaging device 100 and the image sensing device 10. FIG. 6 shows the image of the apparatus for detecting microplastics based on optical technology prepared according to an exemplary embodiment of the present disclosure.

$$R = \frac{12\eta L}{1 - 0.63(h/w)} \frac{1}{h^3 w} \quad \text{(Equation 2)}$$

(R is fluid resistance, h is the height of the microchannel 230, w is the width of the microchannel 230, L is the length of the microchannel 230, and η is the viscosity of the fluid)

Next, the fluid transportation device 300 includes a pressure pump 310, a flow sensor 320, an air compressor 330 and a tube 340. The air compressor 330 stores the fluid containing microplastics, and the fluid containing microplastics is supplied via the tube 340 to the microchannel 230 through the fluid inlet 231 of the microfluidic chip 200.

The flow rate of the fluid supplied to the microfluidic chip 200 is controlled by the pressure pump 310 and the flow sensor 320. The pressure pump 310 applies pressure to the microfluidic chip 200. The flow rate of the fluid may be controlled by controlling the operation of the pressure pump 310. The flow sensor 320 serves to measure the flow rate of the fluid flowing in the tube 340. The operation of pressure pump 310 is controlled based on the flow rate of the fluid measured by the flow sensor 320.

Next, the image sensing device 10 is a device that is equipped at one side of the optical imaging device 100 and senses the beam that has passed through the magnification system 120 of the optical imaging device 100. In an exemplary embodiment, it may consist of an image sensor such as CCD, CMOS, CIS, etc., a digital single-lens reflex camera, etc.

The image analysis device 20 counts the number of microplastics contained in the image and analyzes the shape and size of the microplastics by analyzing the image sensed by the image sensing device 10.

The apparatus for detecting microplastics based on optical technology according to an exemplary embodiment of the present disclosure may further include a pretreatment device 400.

The pretreatment device 400 is a device which removes impurities contained in the fluid to be analyzed by pretreating the fluid. In order to remove the impurities contained in the fluid, the pretreatment device 400 may be configured as an organic pollutant-removing device, a separation membrane or a combination thereof. The organic pollutant-removing device removes organic pollutants contained in the fluid through a chemical or biological process, and the separation membrane separates the impurities from the microplastics through concentration and based on the difference in density.

[Detailed Description of Main Elements]

| | |
|---|---|
| 10: image sensing device | 20: image analysis device |
| 30: three-way valve | 100: optical imaging device |
| 111: light source | 112: Köhler illumination system |
| 113: bandpass filter | 114: first polarizer |
| 115: beam splitter | 116: polarizing prism |
| 117: objective lens | 118: reflecting mirror |
| 119: second polarizer | 120: magnification system |
| 200: microfluidic chip | 210: transparent glass plate |
| 220: flow channel substrate | 230: microchannel |
| 231: fluid inlet | 232: fluid outlet |
| 300: fluid transportation device | 310: pressure pump |
| 320: flow sensor | 330: air compressor |
| 340: tube | 400: pretreatment device |

What is claimed is:

1. An apparatus for detecting microplastics based on optical technology, comprising:
   a microfluidic chip which is equipped with a microchannel through which a fluid containing microplastics moves;
   an optical imaging device which is capable of observing the microplastics contained in the fluid regardless of the transparency of the microplastics by focusing a point in the microchannel;
   an image sensing device which senses the observed image; and
   an image analysis device which counts the number of the microplastics in the image and analyzes the shape and size of the microplastics by analyzing the image sensed by the image sensing device,
   wherein a bandpass filter which passes light of a wavelength in a specific range is disposed between a light source and a first polarizer of the optical imaging device.

2. The apparatus for detecting microplastics based on optical technology according to claim 1, wherein the wavelength range of the bandpass filter has a full width at half maximum (FWHM) of 20-30 nm.

3. The apparatus for detecting microplastics based on optical technology according to claim 1, wherein a magnification system is disposed between a second polarizer of the optical imaging device and the image sensing device, and the magnification system magnifies the image of a beam that has passed through the second polarizer while the optical imaging device remains focused on the microchannel.

4. The apparatus for detecting microplastics based on optical technology according to claim 1, wherein an objective lens of the optical imaging device is disposed below the microfluidic chip so as to focus on the microchannel of the microfluidic chip.

5. The apparatus for detecting microplastics based on optical technology according to claim 1, wherein the optical imaging device comprises:
   a Köhler illumination system which is disposed between a light source and a bandpass filter such that the image of the light source is formed at the back focal plane of an objective lens;
   the bandpass filter which is disposed between the Köhler illumination system and a first polarizer so as to pass light having a wavelength in a specific range;
   the linear first polarizer which converts unpolarized light to polarized light by passing a polarized component of one direction and absorbs or reflects other components;
   a polarizing prism which is disposed at the back focal plane of the objective lens, splits a beam that has been linearly polarized by the first polarizer into two independent perpendicular beams, and allows the beams reflected by a sample to be recombined to interfere with each other;
   a second polarizer which passes only the beam that has been recombined by a DIC prism; and
   a magnification system which magnifies the image of the beam that has passed through the second polarizer while the optical imaging device remains focused on the microchannel.

6. The apparatus for detecting microplastics based on optical technology according to claim 1, wherein the microfluidic chip has a structure in which a flow channel substrate is formed on a transparent glass plate, the microchannel is equipped in the flow channel substrate as the flow channel substrate is excavated partly,
   a fluid inlet and a fluid outlet are provided at each end of the microchannel, respectively, a fluid containing microplastics to be detected is supplied through the fluid inlet, and the fluid is discharged through the fluid outlet by passing through the microchannel after the observation has been completed by the optical imaging device.

* * * * *